(12) United States Patent
Schlör

(10) Patent No.: US 11,772,455 B2
(45) Date of Patent: Oct. 3, 2023

(54) COMBUSTION CHAMBER ASSEMBLY UNIT FOR A FUEL-OPERATED VEHICLE HEATER

(71) Applicant: Eberspächer Climate Control Systems GmbH, Esslingen (DE)

(72) Inventor: Christof Schlör, Lichtenwald (DE)

(73) Assignee: Eberspächer Climate Control Systems GmbH, Esslingen (DE)

( * ) Notice: Subject to any disclaimer, the term of this patent is extended or adjusted under 35 U.S.C. 154(b) by 169 days.

(21) Appl. No.: 17/197,939

(22) Filed: Mar. 10, 2021

(65) Prior Publication Data

US 2021/0283985 A1 Sep. 16, 2021

(30) Foreign Application Priority Data

Mar. 13, 2020 (DE) ..................... 10 2020 106 881.6

(51) Int. Cl.
*B60H 1/22* (2006.01)

(52) U.S. Cl.
CPC ......... *B60H 1/2206* (2013.01); *B60H 1/2212* (2013.01); *B60H 2001/2268* (2013.01); *B60H 2001/2281* (2013.01); *B60H 2001/2284* (2013.01)

(58) Field of Classification Search
USPC ................................................... 237/12.3 C
See application file for complete search history.

(56) References Cited

U.S. PATENT DOCUMENTS

| 5,947,717 A * | 9/1999 | Steiner ..................... F23D 5/12 126/91 A |
| 2015/0040885 A1* | 2/2015 | Dell ........................ F23C 7/004 110/317 |
| 2017/0153026 A1 | 6/2017 | Dell et al. |
| 2018/0172268 A1* | 6/2018 | Ilchenko .............. B60H 1/2203 |

FOREIGN PATENT DOCUMENTS

| DE | 10144407 A1 | 4/2003 |
| DE | 102012101576 A1 | 8/2013 |
| DE | 102013108254 A1 | 2/2015 |
| EP | 3128233 A1 * | 8/2016 |
| EP | 3128233 A1 | 2/2017 |

(Continued)

*Primary Examiner* — Steven B McAllister
*Assistant Examiner* — John E Bargero
(74) *Attorney, Agent, or Firm* — McGlew and Tuttle, P.C.

(57) ABSTRACT

A combustion chamber assembly unit for a fuel-operated vehicle heater includes a mixing chamber (20) extending in a direction of a combustion chamber assembly unit longitudinal axis (L) for generating an air/fuel mixture. A fuel feed device (38) feeds fuel to the mixing chamber (20) and a combustion air feed device feeds combustion air to the mixing chamber (20). A diffuser device (22) is arranged downstream in relation to the mixing chamber (20) in the direction of the combustion chamber assembly unit longitudinal axis (L). The fuel feed device (38) includes an evaporator device (36). The combustion air feed device (18) includes a swirling flow generation device (14). The swirling flow generation device (14) is arranged with the evaporator device (36) upstream in relation to the mixing chamber (20) in the direction of the combustion chamber assembly unit longitudinal axis (L).

20 Claims, 3 Drawing Sheets

(56) References Cited

FOREIGN PATENT DOCUMENTS

| KR | 0101539007 | B1 | 7/2015 |
|----|------------|----|--------|
| RU | 2310794 | C1 | 11/2007 |
| RU | 2443941 | C1 | 2/2012 |
| RU | 2679789 | C1 | 2/2019 |
| WO | 2015014338 | A1 | 2/2015 |

* cited by examiner

COMBUSTION CHAMBER ASSEMBLY UNIT FOR A FUEL-OPERATED VEHICLE HEATER

CROSS REFERENCE TO RELATED APPLICATIONS

This application claims the benefit of priority under 35 U.S.C. § 119 of German Application 10 2020 106 881.6, filed Mar. 13, 2020, the entire contents of which are incorporated herein by reference.

TECHNICAL FIELD

The invention pertains to a combustion chamber assembly unit for a fuel-operated vehicle heater.

TECHNICAL BACKGROUND

A combustion chamber assembly unit for a fuel-operated vehicle heater, in which a porous evaporator medium is arranged upstream in relation to a swirling flow generation device, is known from EP 3 128 233 A1. Liquid fuel is introduced into the porous evaporator medium. The fuel is released on the surface of the porous evaporator medium facing the swirling flow generation device. The air entering from the radially outward direction into the swirling flow generation device is mixed in the area of the swirling flow generation device with the fuel vapor also present therein and leaves the mixing area formed essentially in the area of the swirling flow generation device in the direction towards a diffuser device following downstream of the swirling flow generation device.

SUMMARY

An object of the present invention is to provide a combustion chamber assembly unit for a fuel-operated vehicle heater, with which a reduced emission of nitrogen oxide during the combustion operation can be achieved.

This object is accomplished according to the present invention by a combustion chamber assembly unit for a fuel-operated vehicle heater, comprising:
- a mixing chamber extending in the direction of a combustion chamber assembly unit longitudinal axis for generating an air/fuel mixture,
- a fuel feed device for feeding fuel to the mixing chamber,
- a combustion air feed device for feeding combustion air to the mixing chamber, and
- a diffuser device arranged downstream in relation to the mixing chamber in the direction of the combustion chamber assembly unit longitudinal axis, wherein the fuel feed device comprises an evaporator device and the combustion air feed device comprises a swirling flow generation device, and wherein the swirling flow generation device is arranged with the evaporator device upstream in relation to the mixing chamber in the direction of the combustion chamber assembly unit longitudinal axis.

Due to the sequence of the assembly units swirling flow generation device, mixing chamber with its evaporator device and diffuser device according to the present invention, an improved recirculation of combustion waste gas from the diffuser device is achieved in the area of the mixing chamber and thus in the combustion process, as a result of which the nitrogen oxide content in the combustion waste gas flowing from the diffuser device, for example, in the direction towards a flame tube is reduced.

In order to provide a large volume for the mixing chamber, into which at least a portion of the recirculated waste gas can also be led back, the mixing chamber may be defined by a mixing chamber circumferential wall extending in the direction of the combustion chamber assembly unit longitudinal axis and enclosing same, and that the evaporator device may comprise an inner side of a porous evaporator medium provided at the mixing chamber circumferential wall and overlapping the mixing chamber circumferential wall in at least some areas. The inner side of the porous evaporator medium faces the mixing chamber.

For a uniform introduction of fuel into the mixing chamber, the porous evaporator medium may overlap the mixing chamber circumferential wall essentially over an entire circumference of the mixing chamber circumferential wall, or/and the porous evaporator medium may have an annular or tubular configuration. Essentially the entire inner surface enclosing the mixing chamber may thus be provided by the porous evaporator medium.

In order to make possible a connection of the diffuser device to the mixing chamber in case of the necessary widening of the flow cross section, it is proposed that the diffuser device comprise a diffuser circumferential wall, wherein the diffuser circumferential wall has a first circumferential wall length area with a smaller internal dimension, preferably internal diameter or internal cross-sectional area following the mixing chamber and has a second circumferential wall length area, following downstream of the first circumferential wall length area in the direction of the combustion chamber assembly unit, with in at least some areas greater internal dimension, preferably internal diameter or internal cross-sectional area increasing along the combustion chamber assembly unit longitudinal axis in the direction away from the first circumferential wall length area.

In this connection, the diffuser circumferential wall may be configured with an essentially constant internal dimension along the combustion chamber assembly unit longitudinal axis in the first circumferential wall length area.

In order to achieve a continuous or kink-free transition, for example, to a flame tube or the like, in the second circumferential wall length area, the internal dimension of the diffuser circumferential wall may increase digressively in the direction away from the first circumferential wall length area. A circumferential wall transition area with progressive increase of the internal dimension, preferably internal diameter or internal cross-sectional area, of the diffuser circumferential wall in at least some areas may for this purpose be provided between the first circumferential wall length area and the second circumferential wall length area.

Further, the diffuser circumferential wall may have a third circumferential wall length area with essentially constant internal dimension, preferably internal diameter or internal cross-sectional area along the combustion chamber assembly unit longitudinal axis, which third circumferential wall length area follows downstream of the second circumferential wall length area in the direction of the combustion chamber assembly unit longitudinal axis. This third circumferential wall length area may transition into a flame tube or may provide this flame tube or a part thereof.

For the stabilization of the combustion, it is proposed that the diffuser device has a flame diaphragm carried at the diffuser circumferential wall.

For a structurally simple configuration, the diffuser circumferential wall may be fixed with the first circumferential wall length area at a downstream end area of the mixing chamber circumferential wall.

The swirling flow generation device may comprise a plurality of flow deflection elements arranged following one another in the circumferential direction about the combustion chamber assembly unit longitudinal axis. These flow deflection elements may efficiently deflect the combustion air, for example, in the direction of the combustion chamber assembly unit longitudinal axis, which air is to flow toward this axis, in the circumferential direction.

For connection to the mixing chamber, the combustion air feed device may comprise a swirling flow housing carrying the flow deflection elements, wherein provisions may preferably be made for the swirling flow housing to be fixed at an upstream end area of the mixing chamber circumferential wall.

The present invention further pertains to a fuel-operated vehicle heater, comprising a combustion chamber assembly unit configured according to the present invention.

Such a vehicle heater may further comprise a combustion air blower for feeding combustion air to the mixing chamber via the swirling flow generation device as well as a fuel pump for feeding fuel to the mixing chamber.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
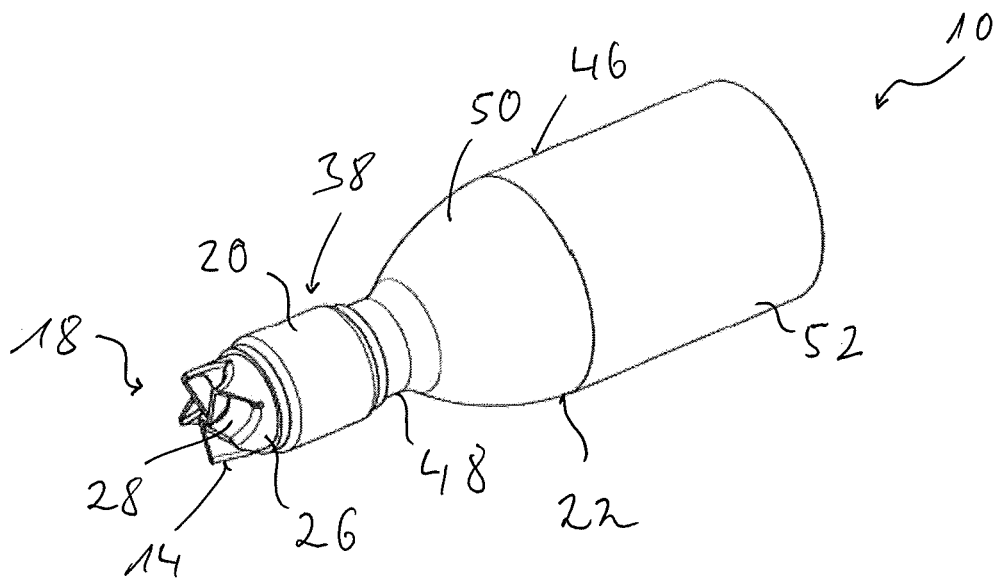
FIG. 1 is a perspective view of a combustion chamber assembly unit for a fuel-operated vehicle heater.
Figure 2:
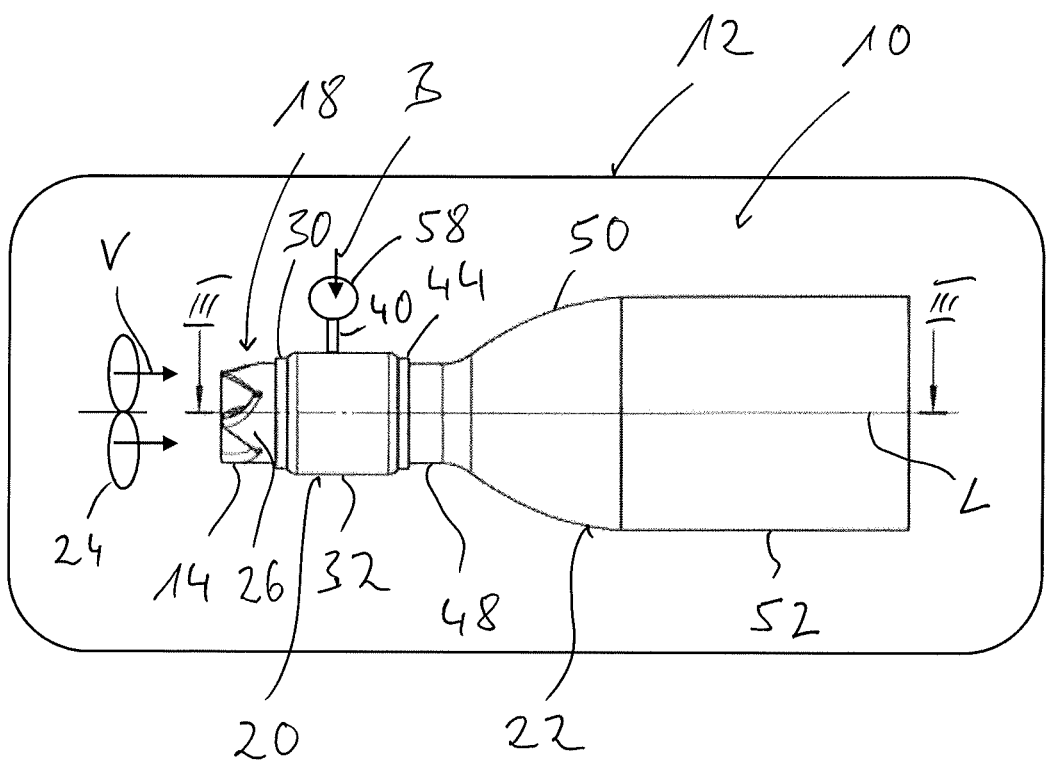
FIG. 2 is a schematic diagram of a fuel-operated vehicle heater with the combustion chamber assembly unit from FIG. 1 shown in a side view.
Figure 3:
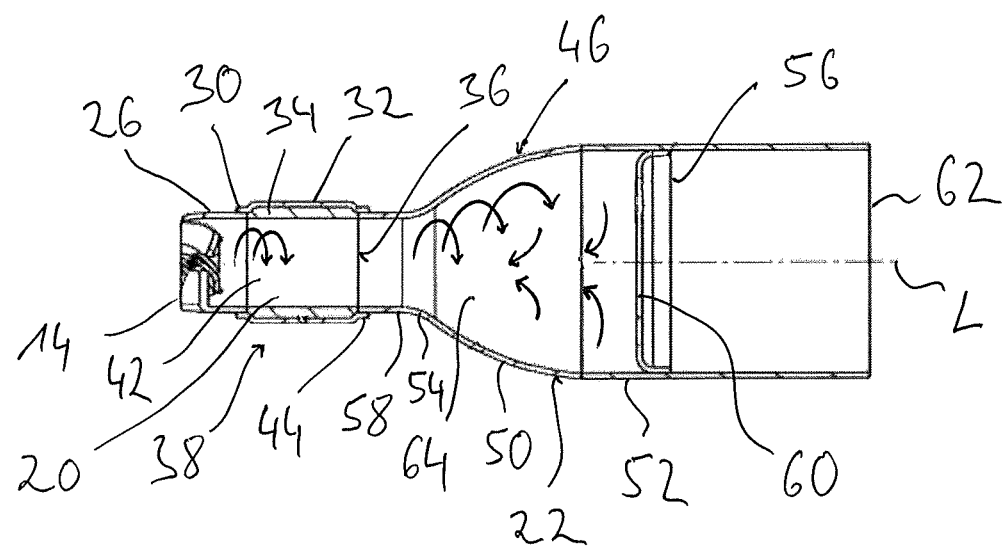
FIG. 3 is a longitudinal sectional view of the combustion chamber assembly unit from FIGS. 1 and 2, cut along a line III-III in FIG. 2.

Referring to the drawings, FIGS. 1 through 3 show a first embodiment of a combustion chamber assembly unit generally designated by 10 for a fuel-operated vehicle heater 12 shown in a schematic diagram in FIG. 2. The combustion chamber assembly unit 10 comprises a combustion air feed device 18 comprising a swirling flow generation device 14 following one another in the direction of a combustion chamber assembly unit longitudinal axis L, a mixing chamber following it downstream as well as a diffuser device 22 following downstream of the mixing chamber 20.

A combustion air blower 24, which is configured, for example, as a side channel blower, feeds the combustion air V needed for the combustion, for example, approximately in the direction of the combustion chamber assembly unit longitudinal axis L towards the swirling flow generation device 14 of the combustion air feed device 18. As a result, the flow of combustion air V, which is at first directed approximately in the direction of the combustion chamber assembly unit longitudinal axis L, is deflected in the circumferential direction, so that a swirling flow of the combustion air V enclosing the combustion chamber assembly unit longitudinal axis L is generated in the mixing chamber 20 following the swirling flow generation device 14 or even in the diffuser device 22 adjoining the mixing chamber 20.

In the exemplary embodiment shown in FIGS. 1 through 3, the swirling flow generation device 14 comprises a swirling flow housing 26 with an approximately tubular or cylindrical configuration. At the upstream end thereof, a plurality of blade-like flow deflection elements 28 following one another are bent in the circumferential direction and may have each a concave structure extending from the radially outward direction to the radially inward direction in the circumferential direction in order to achieve an efficient deflection of the flow of the combustion air V in the circumferential direction.

In its downstream end, the swirling flow housing 26 is inserted into an upstream end area 30 of a mixing chamber circumferential wall 32, which has a basically essentially cylindrical shape, and is thus connected in substance, for example, by welding. An inner side of the mixing chamber circumferential wall 32 is overlapped approximately over the entire axial extension thereof and preferably over the entire circumference with a porous evaporator medium 34, having a tubular or annular configuration, of an evaporator device, generally designated by 36, of a fuel feed device 38. Liquid fuel B is introduced into the porous evaporator medium 34 via a fuel line 40 traversing the mixing chamber circumferential wall or opening into same. By means of capillary feed action and possibly also supported by gravity, the liquid fuel B is distributed in the inner volume of the porous evaporator medium 34, which may be made of, for example, metal mesh, metallic foam, foam ceramic or the like. On the surface exposed in the radially inward direction, the porous evaporator medium 34 releases the fuel B in vapor form into the mixing chamber 20 bordered by the mixing chamber circumferential wall, so that this fuel vapor can mix with the flow of combustion air V introduced into the mixing chamber 20 upstream via the swirling flow generation device 14. This mixing is supported based on the fact that the combustion air flow reaches the mixing chamber 20 as a swirling flow.

The diffuser device 22, which adjoins or is permanently connected to a downstream end area 44 of the mixing chamber circumferential wall 32, comprises a diffuser circumferential wall 46 with a first circumferential wall length area 48. This first circumferential wall length area 48, which is configured along the combustion chamber assembly unit longitudinal axis L with an essentially constant internal dimension, i.e., for example, with an essentially constant internal diameter or constant internal cross-sectional area, i.e., has an essentially cylindrical configuration, is inserted into the downstream end area 44 of the mixing chamber circumferential wall 32 and is permanently connected in substance thereto, for example, by welding.

A second circumferential wall length area 50 of the diffuser circumferential wall 46 follows the first circumferential wall length area 48 of the diffuser circumferential wall

46. The internal dimension of the diffuser circumferential wall 46 increases in this second circumferential wall length area 50. It is seen that this increase of the internal dimension, i.e., for example, of the internal diameter or of the internal cross section is degressive in the direction of the combustion chamber assembly unit longitudinal axis L, i.e., the rate of increase in the direction of the combustion chamber assembly unit longitudinal axis L decreases in the downstream direction until the rate of increase of the internal dimension is zero in the transition to a third circumferential wall length area 52. In the third circumferential wall length area 52, the diffuser circumferential wall 46 has an essentially constant internal dimension, for example, internal diameter or internal cross-sectional area, so that an essentially cylindrical structure of the diffuser circumferential wall 46 is also present in this area, and the transition to the third circumferential wall length area 52 can take place in an essentially kink-free or continuous manner because of the degressive increase of the internal dimension of the diffuser circumferential wall 46 in the second circumferential wall length area.

In the upstream area of the second circumferential wall length area 50, this transitions into the first circumferential wall length area 48 in a circumferential wall transition area 54. Since the first circumferential wall length area 48 has an approximately constant internal dimension in the exemplary embodiment shown, the circumferential wall transition area 54 is configured for a kink-free or continuous connection to the first circumferential wall length area 48 starting from this length area 48 with progressive increase of the internal dimension, i.e., for example, of the internal diameter or of the internal cross-sectional area, of the diffuser circumferential wall 46.

A flame diaphragm 56, which is used to stabilize the combustion or the flame in the area located upstream thereof, i.e., essentially in the mixing chamber 20 and in the diffuser device 22 following it, is provided in the third circumferential wall length area 52.

During the combustion operation, the mixture of combustion air V and fuel B, which is fed by a fuel pump 58, for example, feed pump, generated in the mixing chamber 20 with the swirling flow suggested in FIG. 3 will flow into the area of the diffuser device 22. The combustion is started in this volume area 42 by means of an ignition element, not shown, for example, a glow plug, so that waste gas is formed in the area of the mixing chamber 20 and of the diffuser device 22 because of the combustion occurring there. The combustion waste gas leaves the area located upstream of the flame diaphragm 56 via an opening 60 formed in the flame diaphragm 56 in the direction of a flame tube 62, which then follows and is essentially provided by the third circumferential wall length area 52 of the diffuser circumferential wall 46. In a heat exchanger device, not shown, heat transported in the combustion waste gas can be transferred to a medium to be heated.

Because of the swirling flow generated by the swirling flow generation device 14, a portion of the waste gas entering the diffuser device 22 or even being generated therein is deflected in the radially inward direction and thus in the upstream direction, i.e., also fed back in the direction toward the mixing chamber 20. Due to this feeding back of combustion waste gas in the combustion process, the percentage of nitrogen oxide contained in the waste gas is markedly reduced. Since this recirculation of combustion waste gas is essentially generated by the flow guiding or the swirling flow and since this recirculation is essentially also independent of whether a flame diaphragm 56 is present or of where this flame diaphragm is positioned, a low-loss splitting of the waste gas stream takes place, so that an efficient combustion operation may also take place in the area of the mixing chamber 20 or of the diffuser device 22 adjoining it. For this combustion operation, essentially the volume of the mixing chamber 20 and the volume defined by the first circumferential wall length area 48, by the circumferential wall transition area 54 and by the second circumferential wall length area 50, and partly by the third circumferential wall length area 52 form a combustion chamber 64 of the combustion chamber assembly unit 10.

Figure 4:
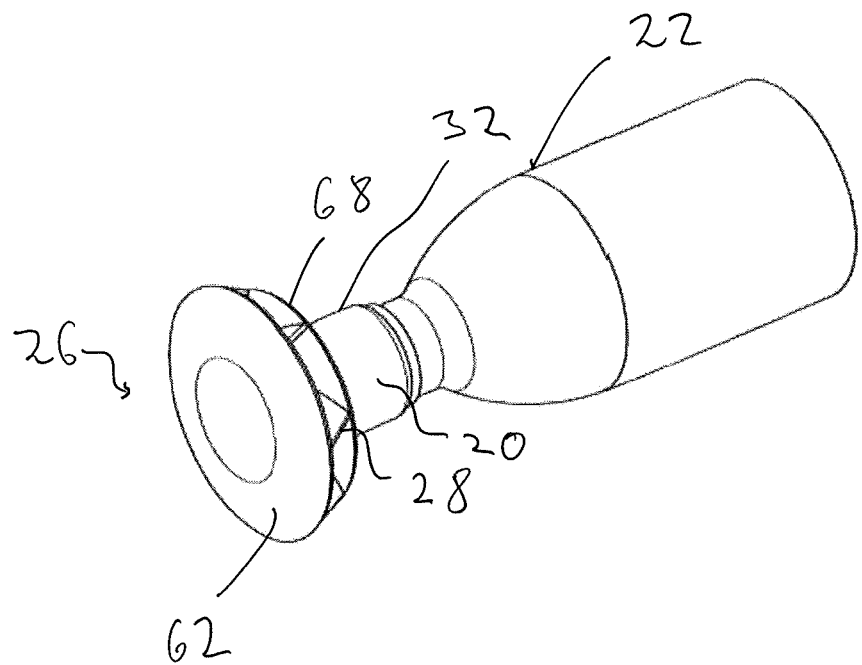
FIG. 4 is a perspective view corresponding to FIG. 1 of a combustion chamber assembly unit for a fuel-operated vehicle heater.
Figure 5:
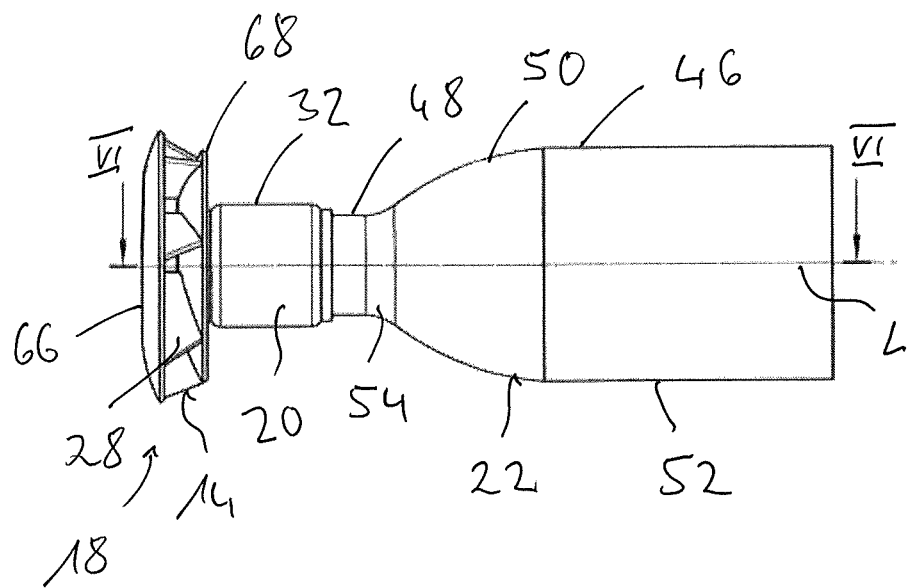
FIG. 5 is a side view of the combustion chamber assembly unit from FIG. 4.
Figure 6:
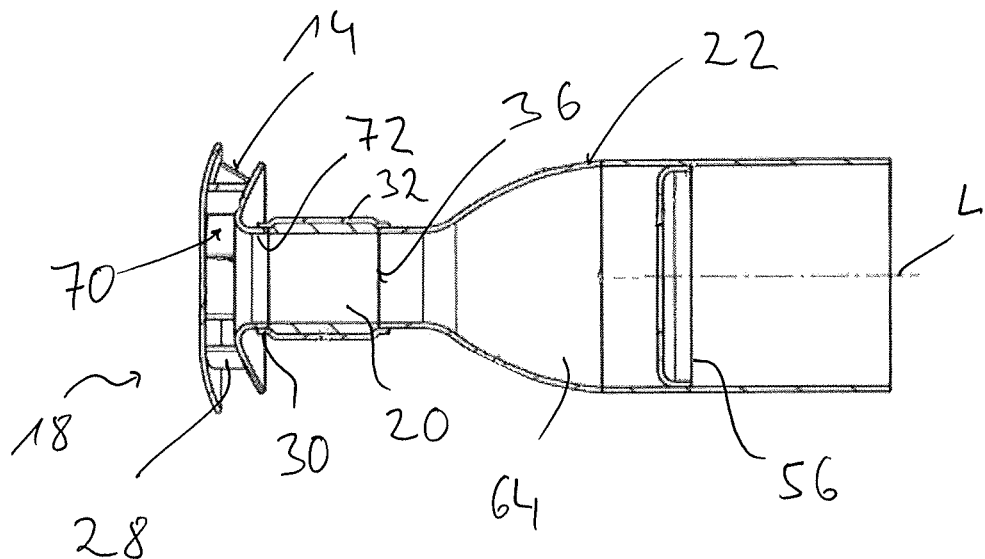
FIG. 6 is a longitudinal sectional view of the combustion chamber assembly unit from FIGS. 4 and 5, cut along a line VI-VI in FIG. 5.

In the embodiment shown in FIGS. 4 through 6, the configuration of the combustion chamber 20 and of the diffuser device 22 essentially corresponds to the configuration described above, so that reference is made to the explanations given in this regard for FIGS. 1 through 3.

There is a difference in the configuration of the swirling flow generation device 14 of the combustion air feed device 18. The swirling flow housing 26 of the combustion air feed device 18 comprises two plate-like or disk-like housing components 66, 68, which are arranged following one another in the direction of the combustion chamber assembly unit longitudinal axis L and which have between them the plurality of flow deflection elements 28 extending from the radially outward direction to the radially inward direction. Flow ducts 70 leading from the radially outward direction to the radially inward direction and following one another, via which the combustion air which is then introduced as swirling flow into the combustion chamber 20 is led from the radially outward direction to the radially inward direction, are thus formed in the circumferential direction. The housing part 68 has a neck section 72 inserted into the upstream end area 30 of the mixing chamber circumferential wall 32 and permanently connected to the mixing chamber circumferential wall 32.

Also in this embodiment of the combustion chamber assembly unit 10, the combustion air V enters the mixing chamber 20 as a swirling flow, is mixed with the evaporated fuel and burned there, so that the combustion waste gas generated in the combustion chamber 64 during the combustion is also led in the radially inward direction and again back in the direction of the mixing chamber 20 because of the swirling flow partially present in the diffuser device 22.

While specific embodiments of the invention have been shown and described in detail to illustrate the application of the principles of the invention, it will be understood that the invention may be embodied otherwise without departing from such principles.

What is claimed is:

1. A fuel-operated vehicle heater combustion chamber assembly unit comprising:
   - a mixing chamber configured to generate an air/fuel mixture and extending in a direction of a combustion chamber assembly unit longitudinal axis, the mixing chamber being defined by a mixing chamber circumferential wall extending in the direction of the combustion chamber assembly unit longitudinal axis and enclosing same and having a wall inner side facing the mixing chamber;
   - a fuel feed device configured to feed fuel to the mixing chamber, wherein the fuel feed device comprises an evaporator device, the evaporator device comprising a porous evaporator medium covering the wall inner side in at least some areas;
   - a combustion air feed device configured to feed combustion air to the mixing chamber, wherein the combustion air feed device comprises a swirling flow generation device arranged with the evaporator device upstream in relation to the mixing chamber in the direction of the combustion chamber assembly unit longitudinal axis; and a diffuser device arranged downstream in relation to the mixing chamber in the direction of the combustion chamber assembly unit longitudinal axis, the diffuser device comprising a diffuser circumferential wall, the diffuser circumferential wall having a first circumferential wall length area with a smaller internal dimension and a second circumferential wall length area, following downstream of the first circumferential wall length area in the direction of the combustion chamber assembly unit, the second circumferential wall length area having, in at least some areas, an internal dimension greater than the smaller internal dimension of the first circumferential wall length area and increasing along the combustion chamber assembly unit longitudinal axis in the direction away from the first circumferential wall length area.

2. The combustion chamber assembly unit in accordance with claim 1, wherein:
the porous evaporator medium covers the mixing chamber circumferential wall essentially over an entire circumference thereof; or
the porous evaporator medium has an annular or tubular configuration; or
the porous evaporator medium covers the mixing chamber circumferential wall essentially over an entire circumference thereof and the porous evaporator medium has an annular or tubular configuration.

3. The combustion chamber assembly unit in accordance with claim 1, wherein the diffuser circumferential wall is configured with an essentially constant internal dimension along the combustion chamber assembly unit longitudinal axis in the first circumferential wall length area.

4. The combustion chamber assembly unit in accordance with claim 1, wherein:
the internal dimension of the diffuser circumferential wall in the second circumferential wall length area increases digressively in the direction away from the first circumferential wall length area; or
a circumferential wall transition area, with progressive increase of internal dimension of the diffuser circumferential wall in at least some areas, is provided between the first circumferential wall length area and the second circumferential wall length area; or
the internal dimension of the diffuser circumferential wall in the second circumferential wall length area increases digressively in the direction away from the first circumferential wall length area and a circumferential wall transition area, with progressive increase of internal dimension of the diffuser circumferential wall in at least some areas, is provided between the first circumferential wall length area and the second circumferential wall length area.

5. The combustion chamber assembly unit in accordance with claim 1, wherein:
the diffuser circumferential wall has a third circumferential wall length area with essentially constant internal dimension along the combustion chamber assembly unit longitudinal axis; and
the third circumferential wall length area follows downstream of the second circumferential wall length area in the direction of the combustion chamber assembly unit longitudinal axis.

6. The combustion chamber assembly unit in accordance with claim 1, wherein the diffuser device further comprises a flame diaphragm carried at the diffuser circumferential wall.

7. The combustion chamber assembly unit in accordance with claim 1,
wherein the diffuser circumferential wall is fixed with the first circumferential wall length area at a downstream end area of the mixing chamber circumferential wall.

8. The combustion chamber assembly unit in accordance with claim 1, wherein the swirling flow generation device comprises a plurality of flow deflection elements arranged following one another in a circumferential direction about the combustion chamber assembly unit longitudinal axis.

9. The combustion chamber assembly unit in accordance with claim 8, wherein the combustion air feed device comprises a swirling flow housing carrying the flow deflection elements.

10. The combustion chamber assembly unit in accordance with claim 8,
wherein the swirling flow housing is fixed at an upstream end area of the mixing chamber circumferential wall.

11. A fuel-operated vehicle heater comprising a combustion chamber assembly unit, the combustion chamber assembly unit comprising:
a mixing chamber configured to generate an air/fuel mixture and extending in a direction of a combustion chamber assembly unit longitudinal axis, the mixing chamber being defined by a mixing chamber circumferential wall extending in the direction of the combustion chamber assembly unit longitudinal axis and enclosing same and having a wall inner side facing the mixing chamber;
a fuel feed device configured to feed fuel to the mixing chamber, wherein the fuel feed device comprises an evaporator device, the evaporator device comprising a porous evaporator medium covering the wall inner side in at least some areas;
a combustion air feed device configured to feed combustion air to the mixing chamber, wherein the combustion air feed device comprises a swirling flow generation device arranged with the evaporator device upstream in relation to the mixing chamber in the direction of the combustion chamber assembly unit longitudinal axis; and
a diffuser device arranged downstream in relation to the mixing chamber in the direction of the combustion chamber assembly unit longitudinal axis, the diffuser device comprising a diffuser circumferential wall, the diffuser circumferential wall having a first circumferential wall length area with a smaller internal dimension and a second circumferential wall length area, following downstream of the first circumferential wall length area in the direction of the combustion chamber assembly unit, the second circumferential wall length area having, in at least some areas, an internal dimension greater than the smaller internal dimension of the first circumferential wall length area and increasing along the combustion chamber assembly unit longitudinal axis in the direction away from the first circumferential wall length area.

12. The fuel-operated vehicle heater in accordance with claim 11, further comprising:
a combustion air blower configured to feed combustion air to the mixing chamber via the swirling flow generation device; and a fuel pump configured to feed fuel to the mixing chamber.

13. The fuel-operated vehicle heater in accordance with claim 11, wherein the diffuser device further comprises a flame diaphragm carried at the diffuser circumferential wall.

14. The fuel-operated vehicle heater in accordance with claim 11,
wherein the diffuser circumferential wall is fixed with the first circumferential wall length area at a downstream end area of the mixing chamber circumferential wall.

15. The fuel-operated vehicle heater in accordance with claim 11, wherein the swirling flow generation device comprises a plurality of flow deflection elements arranged following one another in a circumferential direction about the combustion chamber assembly unit longitudinal axis.

16. The fuel-operated vehicle heater in accordance with claim 15, wherein the combustion air feed device comprises a swirling flow housing carrying the flow deflection elements.

17. A fuel-operated vehicle heater combustion chamber assembly unit comprising:
a mixing chamber structure comprising a mixing chamber structure circumferential wall extending in a direction of a combustion chamber assembly unit longitudinal axis, the mixing chamber structure circumferential wall comprising a mixing chamber structure circumferential wall inner side defining a mixing chamber configured to generate an air/fuel mixture;
a fuel feed device configured to feed fuel to the mixing chamber, wherein the fuel feed device comprises an evaporator device, the evaporator device comprising a porous evaporator medium covering one or more areas of the mixing chamber structure circumferential wall;
a combustion air feed device configured to feed combustion air to the mixing chamber, wherein the combustion air feed device comprises a swirling flow generation device arranged with the evaporator device upstream in relation to the mixing chamber in the direction of the combustion chamber assembly unit longitudinal axis; and
a diffuser device arranged downstream in relation to the mixing chamber in the direction of the combustion chamber assembly unit longitudinal axis, the diffuser device comprising a diffuser circumferential wall, the diffuser circumferential wall having a first circumferential wall length area and a second circumferential wall length area following downstream of the first circumferential wall length area in the direction of the combustion chamber assembly unit, the first circumferential wall length area comprising a first internal dimension, wherein one or more areas of the second circumferential wall length area has a second internal dimension, the second internal dimension being greater than the first internal dimension, the second internal dimension increasing along the combustion chamber assembly unit longitudinal axis in the direction away from the first circumferential wall length area.

18. The combustion chamber assembly unit in accordance with claim 17, wherein:
the porous evaporator medium covers the mixing chamber structure circumferential wall essentially over an entire circumference thereof; or
the porous evaporator medium has an annular or tubular configuration; or
the porous evaporator medium covers the mixing chamber structure circumferential wall essentially over an entire circumference thereof and the porous evaporator medium has an annular or tubular configuration.

19. The combustion chamber assembly unit in accordance with claim 17, wherein the diffuser circumferential wall is configured with an essentially constant internal dimension along the combustion chamber assembly unit longitudinal axis in the first circumferential wall length area.

20. The combustion chamber assembly unit in accordance with claim 17, wherein:
the internal dimension of the diffuser circumferential wall in the second circumferential wall length area increases digressively in the direction away from the first circumferential wall length area; or
a circumferential wall transition area, with progressive increase of internal dimension of the diffuser circumferential wall in at least some areas, is provided between the first circumferential wall length area and the second circumferential wall length area; or
the internal dimension of the diffuser circumferential wall in the second circumferential wall length area increases digressively in the direction away from the first circumferential wall length area and a circumferential wall transition area, with progressive increase of internal dimension of the diffuser circumferential wall in at least some areas, is provided between the first circumferential wall length area and the second circumferential wall length area.

* * * * *